US008215804B2

(12) United States Patent
Lu

(10) Patent No.: US 8,215,804 B2
(45) Date of Patent: Jul. 10, 2012

(54) OUTDOOR LIGHTING DEVICE

(76) Inventor: Shao-Yu Lu, Taoyuan (TW)

( * ) Notice: Subject to any disclaimer, the term of this patent is extended or adjusted under 35 U.S.C. 154(b) by 753 days.

(21) Appl. No.: 12/318,710

(22) Filed: Jan. 7, 2009

(65) Prior Publication Data

US 2009/0179588 A1 Jul. 16, 2009

(30) Foreign Application Priority Data

Jan. 15, 2008 (TW) ................................ 97200880 U

(51) Int. Cl.
*B60Q 3/04* (2006.01)
(52) U.S. Cl. .......................... 362/362; 362/341; 362/800
(58) Field of Classification Search .................. 362/218, 362/250, 294, 498, 800, 199, 341, 362
See application file for complete search history.

(56) References Cited

U.S. PATENT DOCUMENTS 7,033,040 B2 * 4/2006 Spahr et al. .................... 362/155
2002/0191396 A1 * 12/2002 Reiff et al. .................... 362/246
2005/0265024 A1 * 12/2005 Luk ................................ 362/231
2007/0236931 A1 * 10/2007 Chien ............................ 362/250
2008/0186704 A1 * 8/2008 Chou et al. .................... 362/249

* cited by examiner

*Primary Examiner* — Tung X Le
(74) *Attorney, Agent, or Firm* — Rosenberg, Klein & Lee

(57) ABSTRACT

An outdoor lighting device includes a housing, at least one power supply device and at least one arrayed lighting unit. The housing has a surface forming at least one reflection zone and he reflection zone includes a lens. The power supply device is arranged inside the housing and has a grounding terminal connected to the housing. The power supply device receives and converts an alternate current power into an output of direct current power. The arrayed lighting unit includes plural arrays of lighting elements and a light-transmitting protection layer. The arrayed lighting unit is arranged inside the housing at a location corresponding to the lens and is connected to the power supply device, whereby the power supply device provides the arrayed lighting unit with the direct current power to energize the arrayed lighting unit to give off light that is reflected by the reflection zone. As such, an outdoor lighting device containing therein an arrayed lighting unit and an internal built-in power supply device is formed.

15 Claims, 6 Drawing Sheets

OUTDOOR LIGHTING DEVICE

BACKGROUND OF THE INVENTION

1. Field of the Invention

The present invention relates to an outdoor lighting device, and in particular to an outdoor lighting device that features lighting realized by an array of lighting elements and internally concealed direct-current (DC) power supply for providing outdoor lighting.

2. The Related Arts

Conventional outdoor lighting devices, such as street lamps, walkway lights and alameda lights, are commonly used for outdoor lighting. To protect the environment and to save power, the conventional lighting devices, which are often operated with DC bulbs or alternate-current (AC) mercury vapor lamp, are gradually replaced by DC outdoor lighting devices that are operated with light-emitting diodes (LEDs). The conventional LED based DC outdoor lighting devices is often comprised of a plurality of individual LEDs that is arranged in an array for enhancing the illuminating brightness. This makes the cost very high. In addition, each LED needs a respective shade or cover and this often causes interference between adjacent LEDs and makes the control of lighting difficult, and it is difficult for secondary optic processing, and eventually leads to adverse influence to the development of the industry and marketing of product. Further, another problem occurring in composing multiple individual LEDs to form an outdoor lighting device resides in that a power supply is required and the power supply is arranged outside the outdoor lighting device. In other words, the power supply device and the lighting device are separate devices. This makes the installation of the outdoor lighting device very troublesome and an additional space for the power supply device must be taken into consideration. Besides, the power supply device that is located outside the outdoor lighting device is subject to damages caused by weathering and thunder lighting and is easily attacked by invasion of humidity and dusk, leading to shorting and corrosion of parts. Consequently, the power supply device of the conventional outdoor lighting device is of an extreme percentage of malfunctions after a period of service, leading to additional expense for maintenance and repairing. All these make the conventional outdoor lighting devices shortened lifespan, reduced reliability, and poor usability, adding adverse factors to the industry of outdoor lighting devices.

SUMMARY OF THE INVENTION

Thus, the present invention is aimed to provide an outdoor lighting device that alleviates or overcome the problems of high manufacturing cost, poor power saving feature, and difficulty of installation of the outdoor lighting devices and the problem of the power supply being easily damaged.

To achieve the above objective, the present invention provides an outdoor lighting device comprising a housing, at least one power supply device and at least one arrayed lighting unit. The housing has a surface forming at least one reflection zone and he reflection zone includes a lens. The power supply device is arranged inside the housing and has a grounding terminal connected to the housing. The power supply device receives and converts an alternate current power into an output of direct current power. The arrayed lighting unit comprises plural arrays of lighting elements and a light-transmitting protection layer. The arrayed lighting unit is arranged inside the housing at a location corresponding to the lens and is connected to the power supply device, whereby the power supply device provides the arrayed lighting unit with the direct current power to energize the arrayed lighting unit to give off light that is reflected by the reflection zone. As such, an outdoor lighting device containing therein an arrayed lighting unit and an internal built-in power supply device is formed.

The effectiveness of the outdoor lighting device in accordance with the present invention in that a single package of light source is realized by an arrayed lighting unit, which makes the costs low and emission of light easy to control thereby simplifying secondary optic processing and substantially reducing overall manufacturing costs of outdoor lighting devices. Further, the power supply device is arranged inside the housing of the outdoor lighting device. This effectively protects the power supply device from thunder lighting and evasion of humidity and dust that might break the outdoor lighting device or causes malfunction of the outdoor lighting device. Thus, costs for maintenance and repairing of the power supply device are substantially reduced and the lifespan, reliability, and industrial utilization of the outdoor lighting device in accordance with the present invention can be all enhanced.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
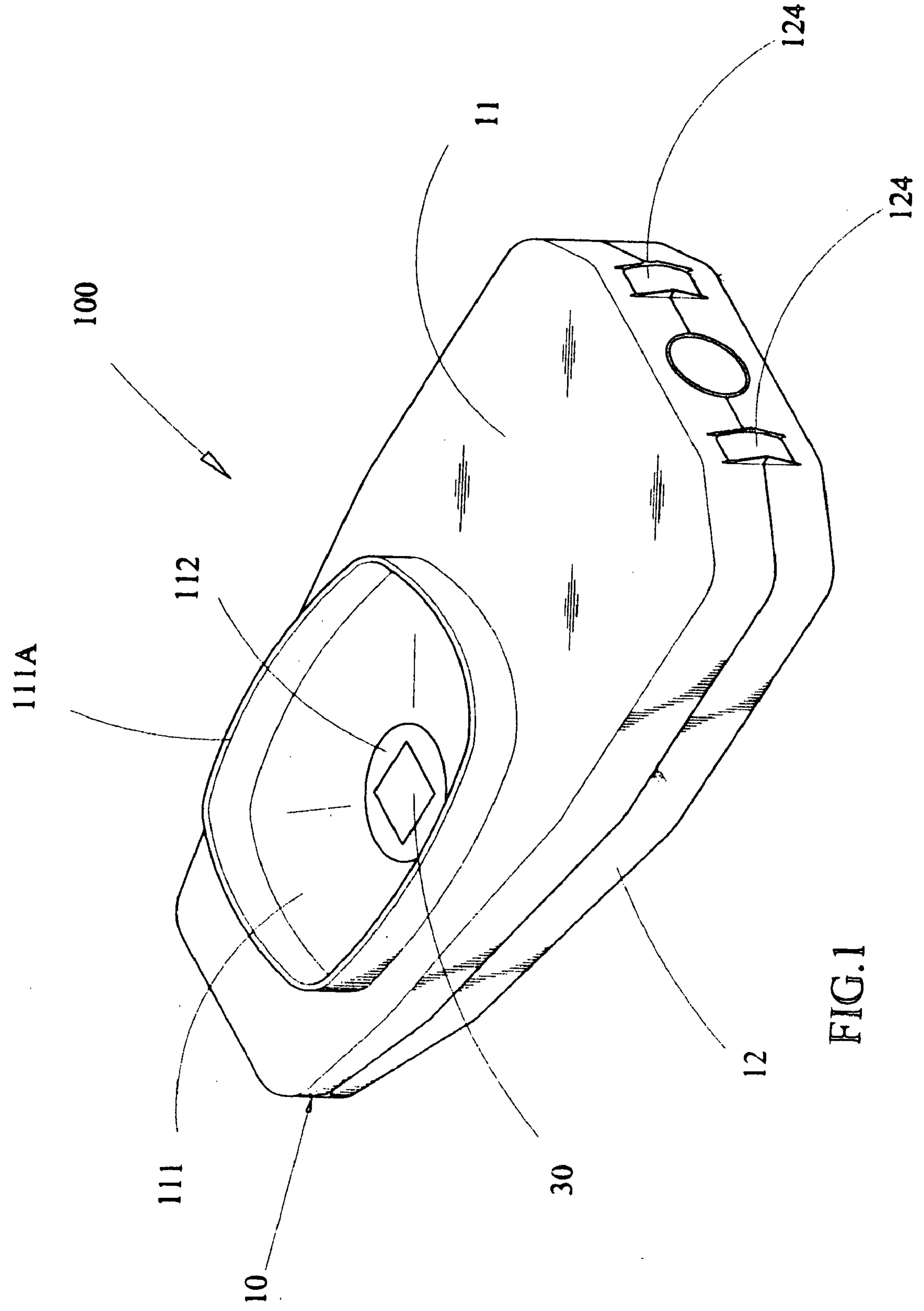
FIG. 1 is a perspective view of an outdoor lighting device constructed in accordance with the present invention in a closed condition.
Figure 2:
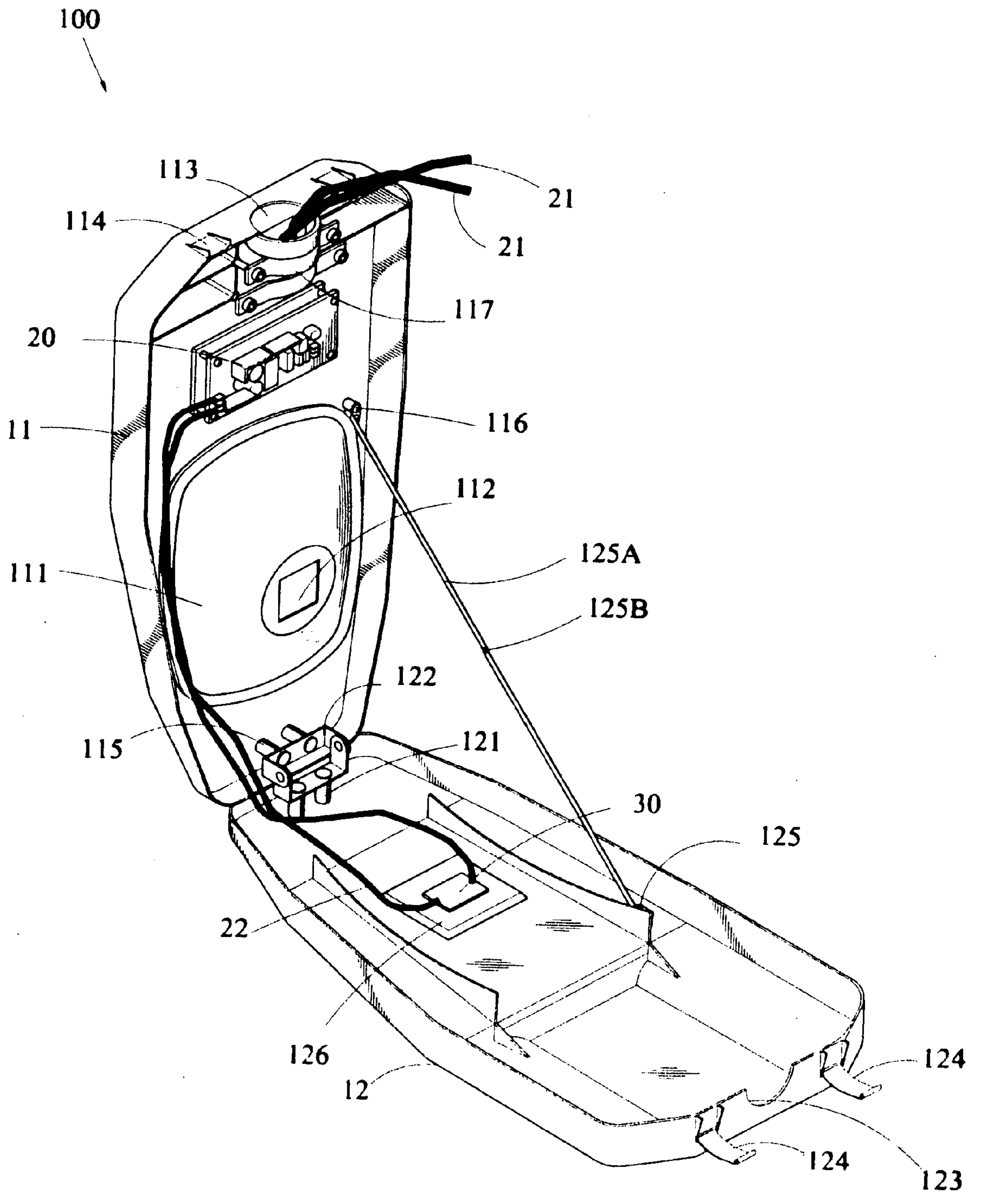
FIG. 2 is also perspective view of the outdoor lighting device of the present invention but is shown in an open condition.
Figure 3:
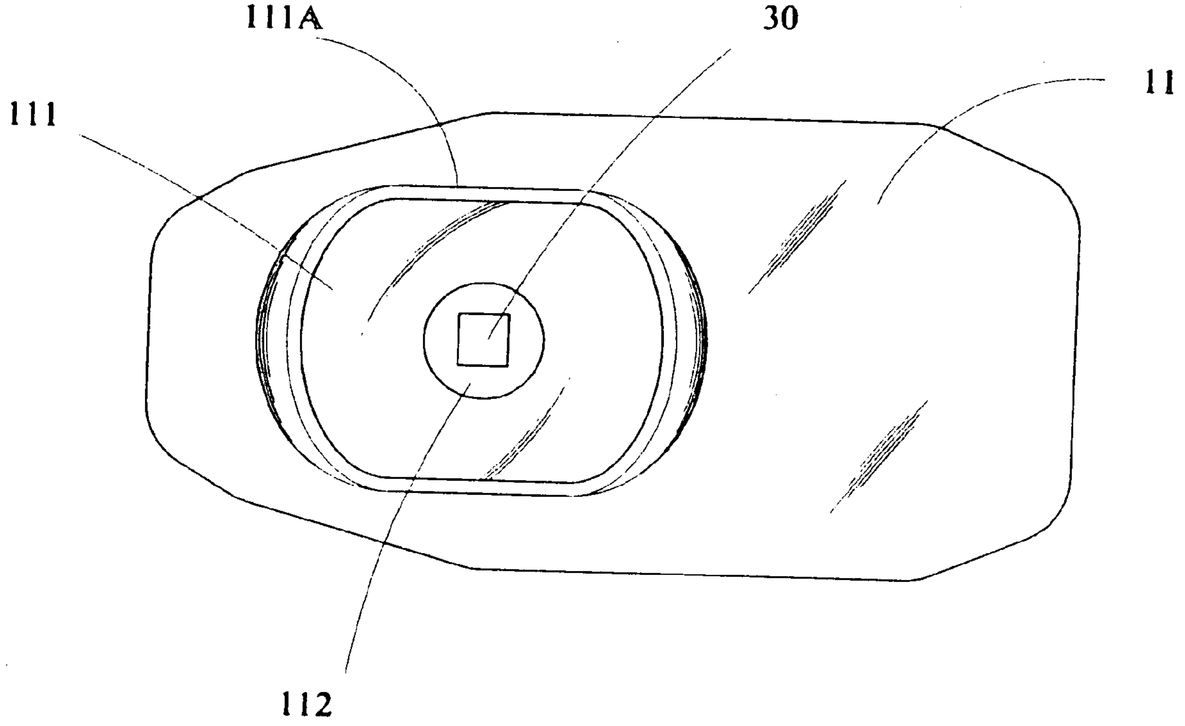
FIG. 3 is a top plan view of the outdoor lighting device of the present invention.

With reference to the drawings and in particular to FIGS. 1-3, an outdoor lighting device constructed in accordance with the present invention, generally designated at 100, is shown. The outdoor lighting device 100 comprises a housing 10 that comprises an upper cover member 11 and a lower cover member 12 openably mating each other. The upper cover member 11 forms thereon a reflection zone 111. A shade 111A is formed on a top of and surrounds the reflection zone 111. A lens 112 is fixed in the reflection zone 111. The upper cover member 11 has an end that forms a wire passage cutoff 113 and two locking slots 114, preferably on opposite sides of the cutoff 113 and an opposite end in which two pivotal joint seats 115 are formed. On an underside (inside) surface of the upper cover member 11, at least two support seats 116 and at least two fixing rings 117 are provided.

The lower cover member 12 has an end forming two mounting seats 121 to which a pivotal joint member 122, which is connected to the pivotal joint seats 115 of the upper cover member 11, is mounted whereby a pivotal connection is formed between the upper and lower cover members 11, 12, which allows the upper cover member 11 to close down to the lower cover member 12 or upward lift from the lower cover member 12 for opening. An opposite end of the lower cover member 12 forms a wire passage cutoff 123 and two locking buckles 124. The wire passage cutoff 123 is mateable with the wire passage cutoff 113 of the upper cover member 11 and also function to fit, together with the fixing rings 117, over and fix to for example a utility pole (not shown) to thereby mounting the housing 10 to the utility pole and realizing grounding through the utility pole.

The locking buckles 124 are engageable with the locking slots 114 of the upper cover member 11 when the upper cover member 11 is closed down to the lower cover member 12, to thereby secure the upper cover member 11 to the lower cover member 12. On an inside surface of the lower cover member 12, two support seats 125 and at least one fixing zone 126 are formed. A linking member 125A, which is connected between the support seats 125 of the lower cover member 12 and the support seats 116 of the upper cover member 16, comprises at least one foldable joint 125B connected between two segments thereof respectively connected to the support seats 125, 116, whereby when the upper cover member 11 is upward lifted and opened with respect to the lower cover member 12, the linking member 125A firmly hold the upper cover member 11 in the upward-lifted and opened condition; and when the upper cover member 11 is closed down to the lower cover member 12, the foldable joint 125B allows the segments of the linking member 125 to collapse to each other and stowed into the lower cover member 12. The fixing zone 126 is located corresponding to the lens 112 of the upper cover member 11.

It is noted that the configuration and shape of the housing 10 are not limited to the pivotally connected upper and lower cover members 11 and 12 and can be of any desired construction provided that equivalent functions can be realized.

At least one power supply device 20 is arranged inside the upper cover member 11 of the housing 10. The power supply device 20 comprises AC power input wires 21 and DC power output wires 22. The power input wires 21 extend through the passage delimited by the wire-passage cutouts 113, 123 of the cover members 11, 12 to connect to an external AC power source, whereby the power supply device 20 receives and converts AC power that is supplied from the external power source through the power input wires 21 into DC power that is output through the power output wires 22.

Figure 4:
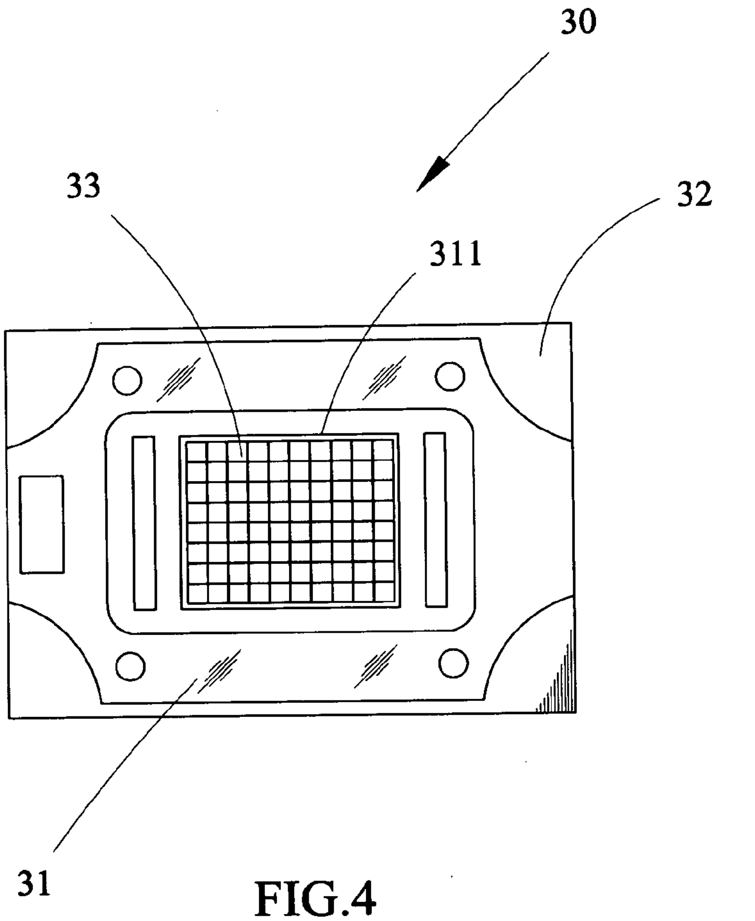
FIG. 4 is a plan view of an arrayed lighting unit of the outdoor lighting device of the present invention.
Figure 5:
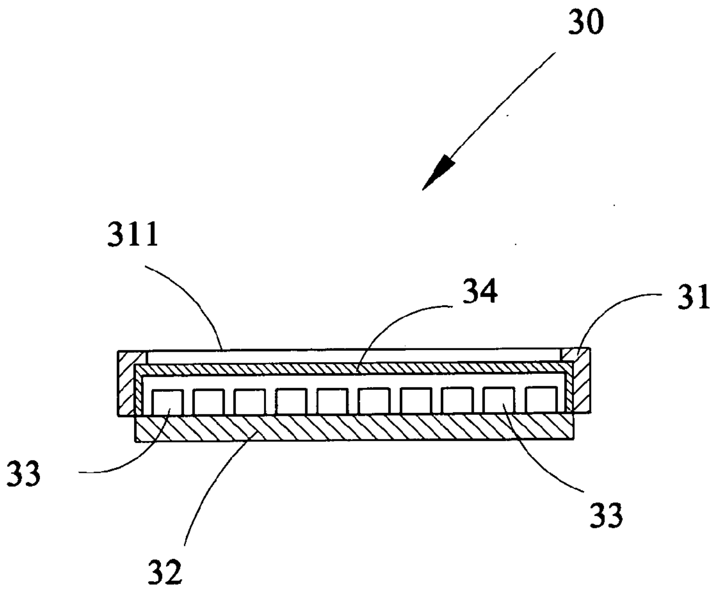
FIG. 5 is a cross-sectional view of the arrayed lighting unit of the outdoor lighting device of the present invention.

Also referring to FIGS. 4 and 5, at least one arrayed lighting unit 30 is mounted to the fixing zone 126 of the lower cover member 12 of the housing 10. The arrayed lighting unit 30 can be of any desired form and type and is, as illustrated in the embodiment described, comprised of an array of light-emitting diodes (LEDs). The arrayed lighting unit comprises a package enclosure 31 having a surface in which an opening 311 is defined. At least one circuit board substrate 32 is mounted to a bottom of the package enclosure 31 and carries an LED ON/OFF control circuit. The circuit board substrate 32 is electrically connected to the power output wires 22 of the power supply device 20 to receive the output DC power from the power supply device 20. A plurality of LED chips 33 is mounted on the circuit board substrate 32 in an array. Each LED chip 33 is set corresponding to the opening 311 of the package enclosure 31 and power for energizing each LED chip 33 and ON/OFF control of each LED chip 33 are provided/realized by the circuit board substrate 32. A light-transmitting protection layer 34 is arranged above and covers all the LED chips 33 so that a single light source is formed by the combination of all the LED chips 33. Light emitted from the single light source travels through the opening 311 and transmits through the lens 112 of the upper cover member 11 for emission and is also redirected in a desired direction and sprayed by the reflection zone 111 for further outward emission.

Figure 6:
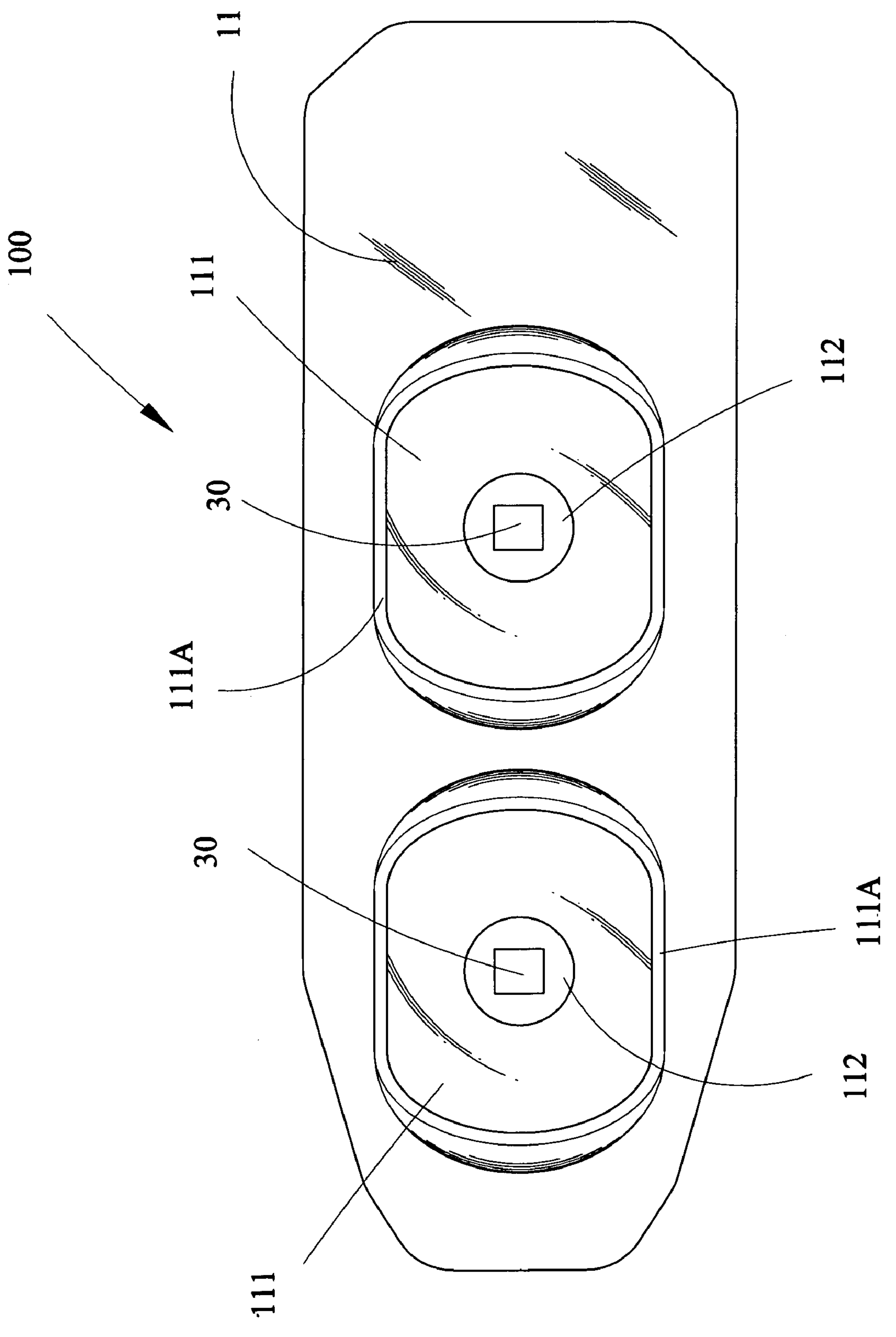
FIG. 6 is a top plan view of an outdoor lighting device constructed in accordance with another embodiment of the present invention.

Referring to FIG. 6, which shows an outdoor lighting device constructed in accordance with another embodiment of the present invention, also designated with reference numeral 100 for simplicity, the outdoor lighting device of said another embodiment comprises an upper cover member 11 in which two reflection zones 111 and two corresponding lenses 112 are provided to respectively guide and redirect lights from two arrayed lighting units 30 in the desired direction(s). Thus, overall brightness and the radiation ranges that are realized by the outdoor lighting device 100 of the said another embodiment are enhanced.

Figure 7:
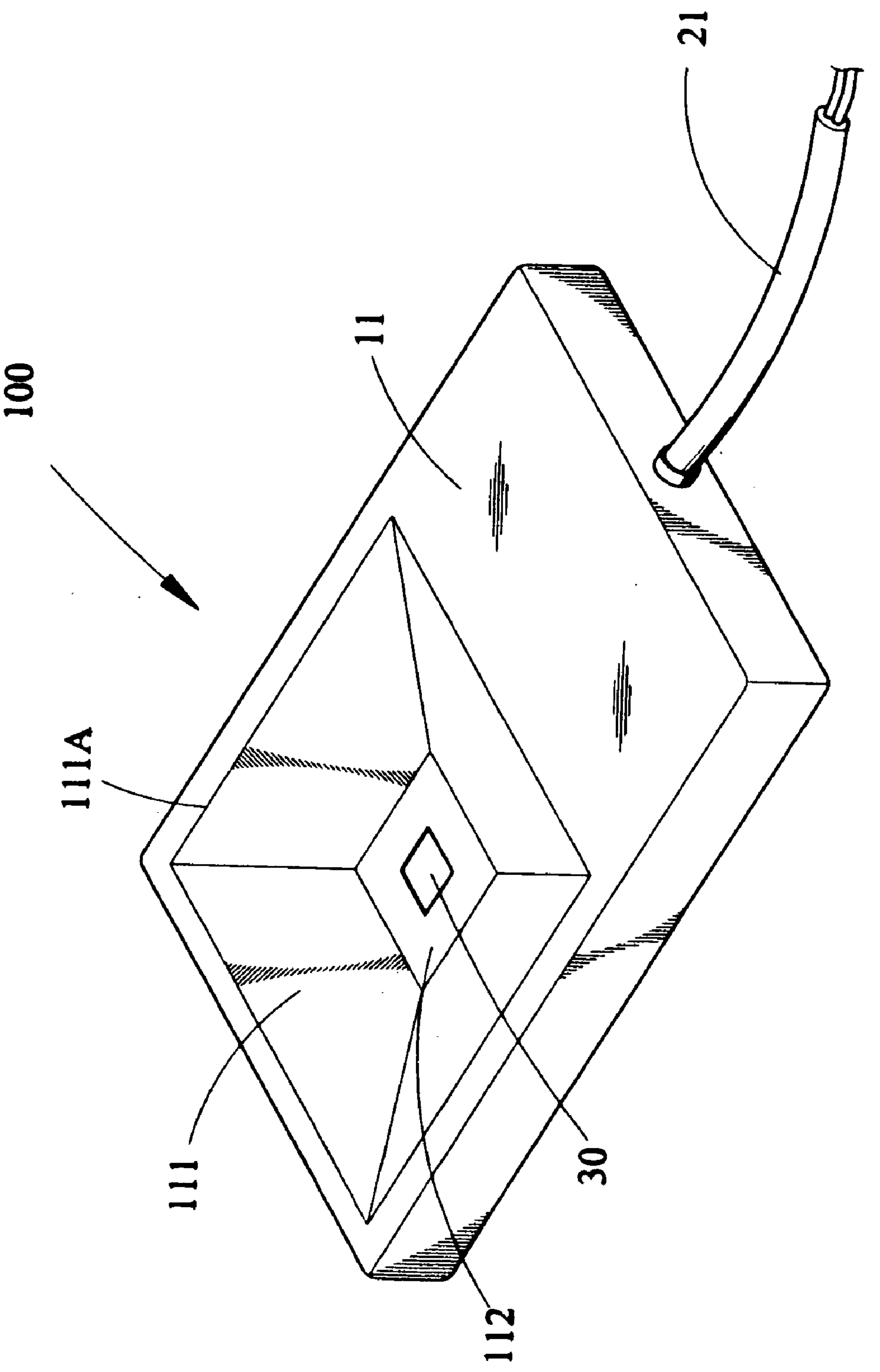
FIG. 7 is a perspective view of an outdoor lighting device constructed in accordance with a further embodiment of the present invention.

Referring to FIG. 7, an outdoor lighting device in accordance with a further embodiment of the present invention is illustrated, which is also designated with reference numeral 100 for simplicity. As shown, the outdoor lighting device of the said further embodiment comprises a housing that is composed of upper and lower cover members 11, 12 that are made in the form suitable for outdoor walkways in order to allow the present invention to be applied to walkway lighting.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An outdoor lighting device, comprising:

a housing having a top forming at least one reflection zone;

at least one power supply device arranged inside the housing and adapted to electrically connect an external alternate-current power source to receive and convert alternate-current power into direct-current power; and at least one arrayed lighting unit arranged inside the housing and corresponding to the reflection zone of the housing, the arrayed lighting unit being electrically connected to the power supply device to receive the direct-current power for energizing the arrayed lighting unit to give off light, the light being transmitted into and reflected and sprayed by the reflection zone;

wherein the housing comprises:

an upper cover member having a top forming said at least one reflection zone, the upper cover member having an end forming a pivotal joint seat; and a lower cover member having an end forming a mounting seat to which a pivotal joint member is mounted, the pivotal joint member being connected to the pivotal joint seat of the upper cover member.

2. The outdoor lighting device as claimed in claim 1, wherein the upper cover member comprises a shade formed on a top of the reflection zone.

3. The outdoor lighting device as claimed in claim 1, wherein the reflection zone of the upper cover member comprises a lens.

4. The outdoor lighting device as claimed in claim 1, wherein the upper cover member has an end forming a wire-passage cutoff.

5. The outdoor lighting device as claimed in claim 1, wherein the upper cover member has an end forming locking slots.

6. The outdoor lighting device as claimed in claim 1, wherein the upper cover member forms on an underside surface thereof a support seat.

7. The outdoor lighting device as claimed in claim 1, wherein the upper cover member forms on an underside surface thereof at least one fixing ring.

8. The outdoor lighting device as claimed in claim 1, wherein the lower cover member has an end forming a wire-passage cutoff.

9. The outdoor lighting device as claimed in claim 1, wherein the lower cover member has an end forming locking buckles.

10. The outdoor lighting device as claimed in claim 1, wherein the lower cover member forms on an inside surface thereof a support seat.

11. The outdoor lighting device as claimed in claim 1 further comprising a linking member coupled between the upper and lower cover members.

12. The outdoor lighting device as claimed in claim 11, wherein the linking member comprises at least one foldable joint.

13. The outdoor lighting device as claimed in claim 1, wherein the lower cover member forms on an inside surface thereof a fixing zone.

14. The outdoor lighting device as claimed in claim 1, wherein the arrayed lighting unit comprises:

a package enclosure having a surface forming an opening;

at least one circuit board substrate mounted to a bottom of the package enclosure and carrying a light-emitting diode ON/OFF control circuit, the circuit board substrate being electrically connected to the direct-current power from the power supply device;

a plurality of light-emitting diode chips arranged in an array on the circuit board substrate, each being set corresponding to the opening of the package enclosure and being supplied with the direct-current power for energizing each individual light-emitting diode chip by the circuit board substrate and being controlled ON/OFF by the circuit board substrate; and a light-transmitting protection layer arranged above the light-emitting diode chips, whereby the light-emitting diodes are combined together to form a single light source.

15. An outdoor lighting device, comprising:

a housing having a top forming at least one reflection zone;

at least one power supply device arranged inside the housing and adapted to electrically connect an external alternate-current power source to receive and convert alternate-current power into direct-current power; and at least one arrayed lighting unit arranged inside the housing and corresponding to the reflection zone of the housing, the arrayed lighting unit being electrically connected to the power supply device to receive the direct-current power for energizing the arrayed lighting unit to give off light, the light being transmitted into and reflected and sprayed by the reflection zone;

wherein the arrayed lighting unit comprises:

a package enclosure having a surface forming an opening;

at least one circuit board substrate mounted to a bottom of the package enclosure and carrying a light-emitting diode ON/OFF control circuit, the circuit board substrate being electrically connected to the direct-current power from the power supply device;

a plurality of light-emitting diode chips arranged in an array on the circuit board substrate, each being set corresponding to the opening of the package enclosure and being supplied with the direct-current power for energizing each individual light-emitting diode chip by the circuit board substrate and being controlled ON/OFF by the circuit board substrate; and a light-transmitting protection layer arranged above the light-emitting diode chips, whereby the light-emitting diodes are combined together to form a single light source.

* * * * *